United States Patent [19]

Graf

[11] Patent Number: 5,093,900
[45] Date of Patent: Mar. 3, 1992

[54] RECONFIGURABLE NEURAL NETWORK

[75] Inventor: Hans P. Graf, East Keansburg, N.J.

[73] Assignee: AT&T Bell Laboratories, Murray Hill, N.J.

[21] Appl. No.: 654,998

[22] Filed: Feb. 13, 1991

[51] Int. Cl.⁵ .............................................. G06F 15/18
[52] U.S. Cl. ........................................ 395/24; 395/27; 364/807; 364/602
[58] Field of Search ................... 395/24, 27; 364/807, 364/602, 201; 365/189.08

[56] References Cited

U.S. PATENT DOCUMENTS

| | | | |
|---|---|---|---|
| 4,988,891 | 6/1991 | Mashiko | 364/807 |
| 5,021,988 | 1/1991 | Mashiko | 307/201 |
| 5,039,870 | 8/1991 | Engeler | 307/201 |

OTHER PUBLICATIONS

Schwartz et al., "A Programmable Analog Neural Network Chip", IEEE Jour. Solid State Circuits, vol. 24(3), Apr. 1989, pp. 688-697.
Mead et al., Analog VLSI Implementation of Neural Systems, Klumer Academic Pub., 1989, pp. 135-169.
Rosetto et al., "Analog VLSI Synaptic Matrices as Building Blocks for Neural Networks", IEEE Micro, Dec. 1989, pp. 56-63.
Kub et al., "Programmable Analog Vector-Matrix Multipliers", IEEE Jour. of Solid-State Circuits, vol. 25(1), Feb. 1990, pp. 207-214.
Salam et al., "A Feed Forward Neural Network for CMOS VLSI Implementation", IEEE Midwest Symposium on Circuits and Systems, 1990, pp. 489-492.

*Primary Examiner*—Michael R. Fleming
*Assistant Examiner*—Robert Downs
*Attorney, Agent, or Firm*—Gregory C. Ranieri

[57] ABSTRACT

Realization of a reconfigurable neuron for use in a neural network has been achieved using analog techniques. In the reconfigurable neuron, digital input data are multiplied by programmable digital weights in a novel connection structure whose output permits straightforward summation of the products thereby forming a sum signal. The sum signal is multiplied by a programmable scalar, in general, 1, when the input data and the digital weights are binary. When the digital input data and the digital weights are multilevel, the scalar in each reconfigurable neuron is programmed to be a fraction which corresponds to the bit position in the digital data representation, that is, a programmable scalar of $\frac{1}{2}$, $\frac{1}{4}$, $\frac{1}{8}$, and so on. The signal formed by scalar multiplication is passed through a programmable build out circuit which permits neural network reconfiguration by interconnection of one neuron to one or more other neurons. Following the build out circuit, the output signal therefrom is supplied to one input of a differential comparator for the reconfigurable neuron. The differential comparator receives its other input from a supplied reference potential. In general, the comparator and reference potential level are designed to generate the nonlinearity for the neuron. One common nonlinearity is a hard limiter function. The present neuron offers the capability of synthesizing other nonlinear transfer functions by utilizing several reference potential levels connected through a controllable switching circuit.

1 Claim, 5 Drawing Sheets

RECONFIGURABLE NEURAL NETWORK

TECHNICAL FIELD

This invention relates to massively parallel computation networks and, more particularly, to microelectronic hardware implementations of such networks.

BACKGROUND OF THE INVENTION

Fine grain, parallel computing architectures are continuing to be studied as a means of breaking through limitations of single processor computers. The parallel computing architectures loosely imitate neural functions. One neural function performed by these so-called neural networks is pattern recognition. In neural networks, pattern recognition has been performed primarily with software-defined simulations as opposed to custom integrated circuits. This is because the massively parallel computing operations of the neural network and the large number of interconnections required for such a realization lend themselves more readily to software, rather than hardware, solutions.

Hardware implementations of neural networks cover a wide spectrum of electronic circuits from digital emulators to fully analog networks. The large interconnectivity of neural networks combine with the moderate level of precision required in the computations has sparked interest in analog hardware solutions. Analog circuits theoretically permit a much higher density of connections than corresponding digital circuits. On the other hand, digital implementations permit greater flexibility than analog circuits. They also can be designed to perform computations with arbitrary levels of precision. These attributes continue to make digital implementations of neural networks the preferred choice over analog realizations.

SUMMARY OF THE INVENTION

Realization of a reconfigurable neuron for use in a neural network has been achieved using analog techniques. In the reconfigurable neuron, digital input data are multiplied by programmable digital weights in a novel connection structure whose output permits straightforward summation of the products thereby forming a sum signal. The sum signal is multiplied by a programmable scalar, in general, 1, when the input data and the digital weights are binary. When the digital input data and the digital weights are multilevel, the scalar in each reconfigurable neuron is programmed to be a fraction which corresponds to the bit position in the digital data representation, that is, a programmable scalar of $\frac{1}{2}$, $\frac{1}{4}$, $\frac{1}{8}$, and so on. The signal formed by scalar multiplication is passed through a programmable build out circuit which permits neural network reconfiguration by interconnection of one neuron to one or more other neurons. Following the build out circuit, the output signal therefrom is supplied to one input of a differential comparator for the reconfigurable neuron. The differential comparator receives its other input from a supplied reference potential. In general, the comparator and reference potential level are designed to generate the nonlinearity for the neuron. One common nonlinearity is a hard limiter function. The present neuron offers the capability of synthesizing other nonlinear transfer functions by utilizing several reference potential levels connected through a controllable switching circuit.

In one embodiment, a current mirror is employed to transfer the sum signal from the analog connections to the scalar multiplier while isolating the analog connections from the programmable scalar multiplier.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
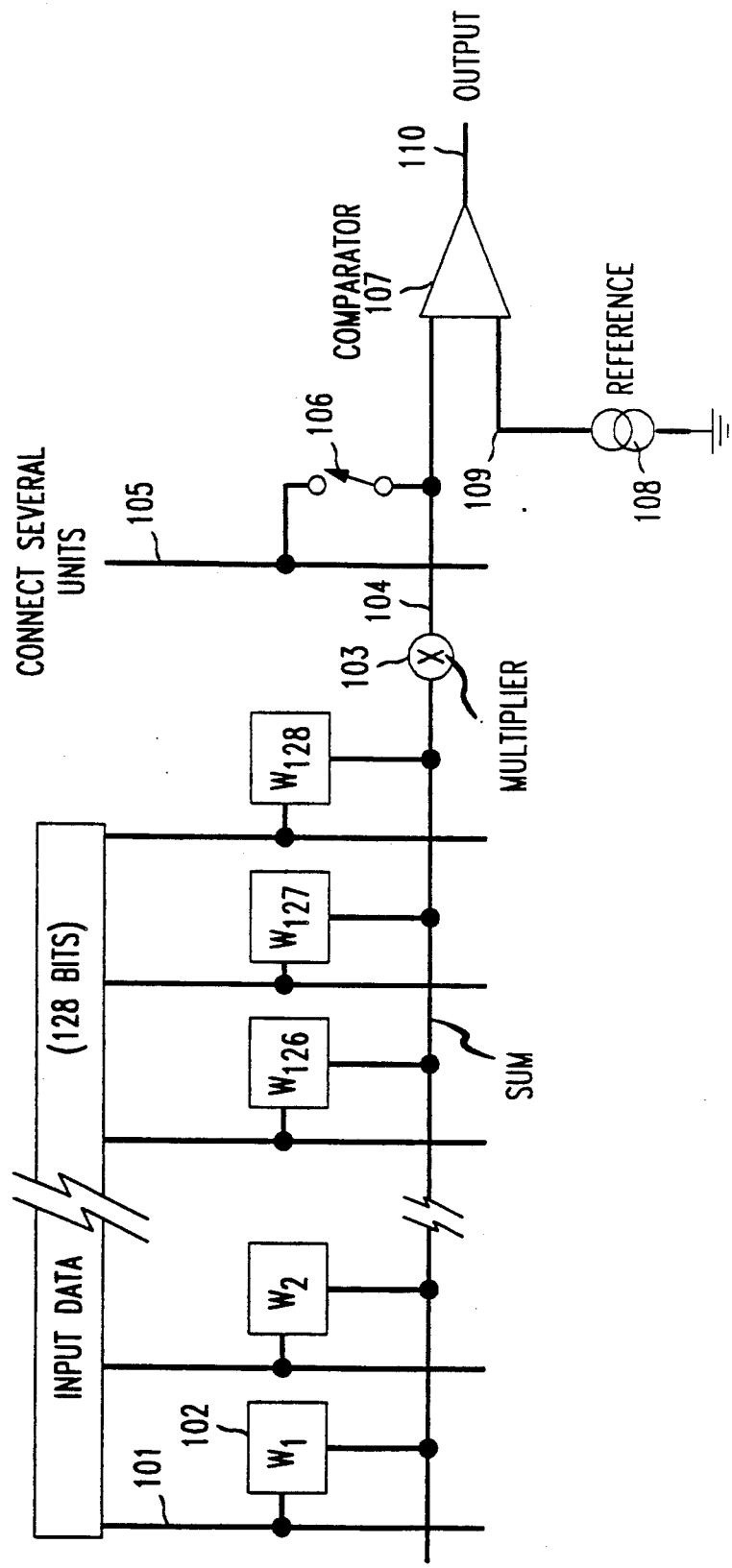
FIG. 1 shows a single neuron building block realized in accordance with the principles of the present invention.

FIG. 1 shows a simplified block diagram for a reconfigurable neuron in accordance with the principles of the present invention. The reconfigurable neuron accepts a plurality of input data bits from an external source on a basis of one input bit per connection within the neuron. An input data bit such as the first bit is input to the neuron on connection 101. The value of the first bit on connection 101 is multiplied by weight $w_1$ in element 102. The product of the first bit and weight $w_1$ is output to line SUM which is in the form of a bus. Each product from the multiplication of the plurality of data bits with the plurality of corresponding weights is output to line SUM. The plurality of products are added together to form an analog or multilevel sum.

The analog sum appearing on line SUM is the dot product or inner product of the input data bits with the plurality of weights, each arranged as a vector. In order to produce the sum, it is necessary that the output stage of the multiplier, accepting the weight and input data bits as input, operates as a constant current source. That is, one fixed amount of current appears for a product in the first binary state and another fixed amount of current appears for the product in the second binary state. For example, where the input data bits and weights can assume the binary values of $+1$ and $-1$, the multiplier operates by performing a four quadrant multiplication to generate a product of either $+1$ or $-1$. An exemplary connection including such a multiplier is described in my copending U.S. patent application Ser. No. 07/654,845 filed on even date herewith, which is expressly incorporated herein by reference.

The analog sum on line SUM is supplied to programmable scalar multiplier 103. For the example shown in FIG. 1, the scalar value input to the multiplier is 1 because the input data bit and weights are single bit words. It will be shown below that other possible scaling values can be supplied to the multiplier when the input data words and weights are multibit words. The output of multiplier 103 is supplied on line 104 to the input of comparator 107. One benefit from using a single scalar multiplier is that there is only one multiplier used for the plurality of connections in a neuron rather than one multiplier for each connection. The reduction in multiplication circuitry is significant.

A programmable build out circuit is shown comprising bus line 105 and switch 106. The function of the programmable build out circuit is to permit reconfiguration of the neural network by interconnecting two or more neurons together. When switch 106 is closed, the signal on line 104 is added to the signal from other neurons on line 105. The total sum of signals from lines 104 and 105 is supplied to the input of comparator 107.

Comparator 107 is shown in FIG. 1 as a differential comparator. One analog input signal from the neuron is supplied to the plus (+) input and a reference potential from source 108 is supplied to the minus (−) input. Comparator 107 and reference 108 combine to provide the output nonlinearity required by the neuron. It will be clear to those skilled in the art that the present neuron offers the capability of synthesizing several different nonlinear transfer functions including a hard limiter function. Synthesis of the functions is effected by utilizing several supply reference potentials connected through a controllable switching circuit to a summing bus on lead 109 connected to the reference or minus input of comparator 107. The output of the comparator is supplied on lead 110.

The neuron circuit described above has been realized using CMOS technology. It consists of an array of 128 connections which receive input signals from other neurons or from external data sources. The current from all the connections for the neuron summed on line SUM corresponds to the inner product of the input data vector and the weight vector wherein each of the vectors has 128 one-bit components.

Figure 2:
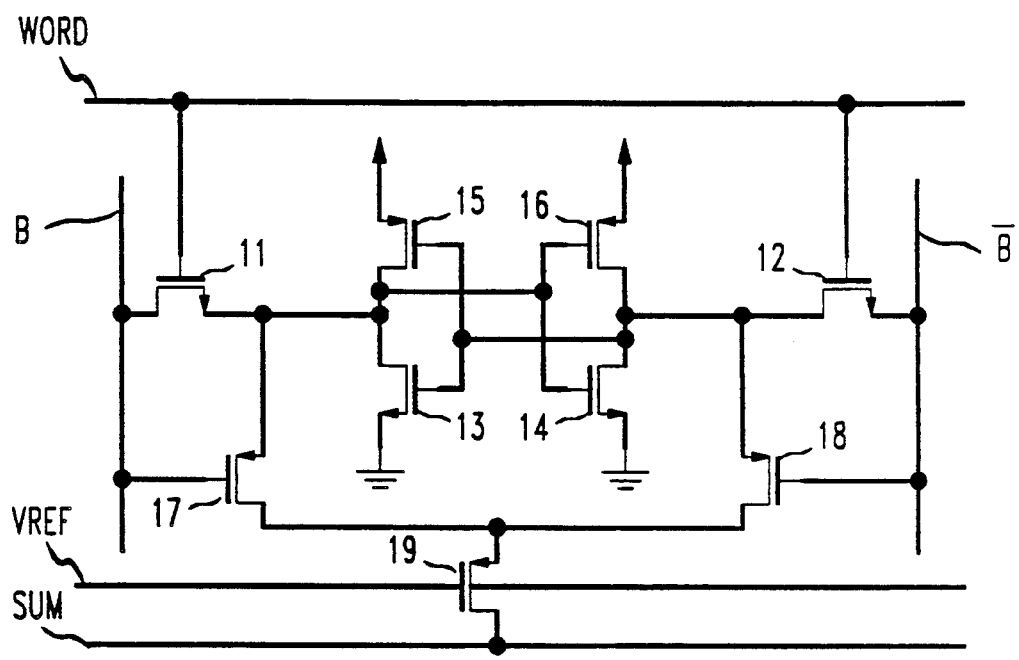
FIG. 2 shows an exemplary connection used in the realization of the neuron and having a suitable constant current (current source) output state.

FIG. 2 shows an exemplary circuit for realizing the neuron connections from line 101 through weight storage and multiplier 102 to bus line SUM. The description of this circuit is presented in the copending application cited above and incorporated expressly by reference.

Figure 3:
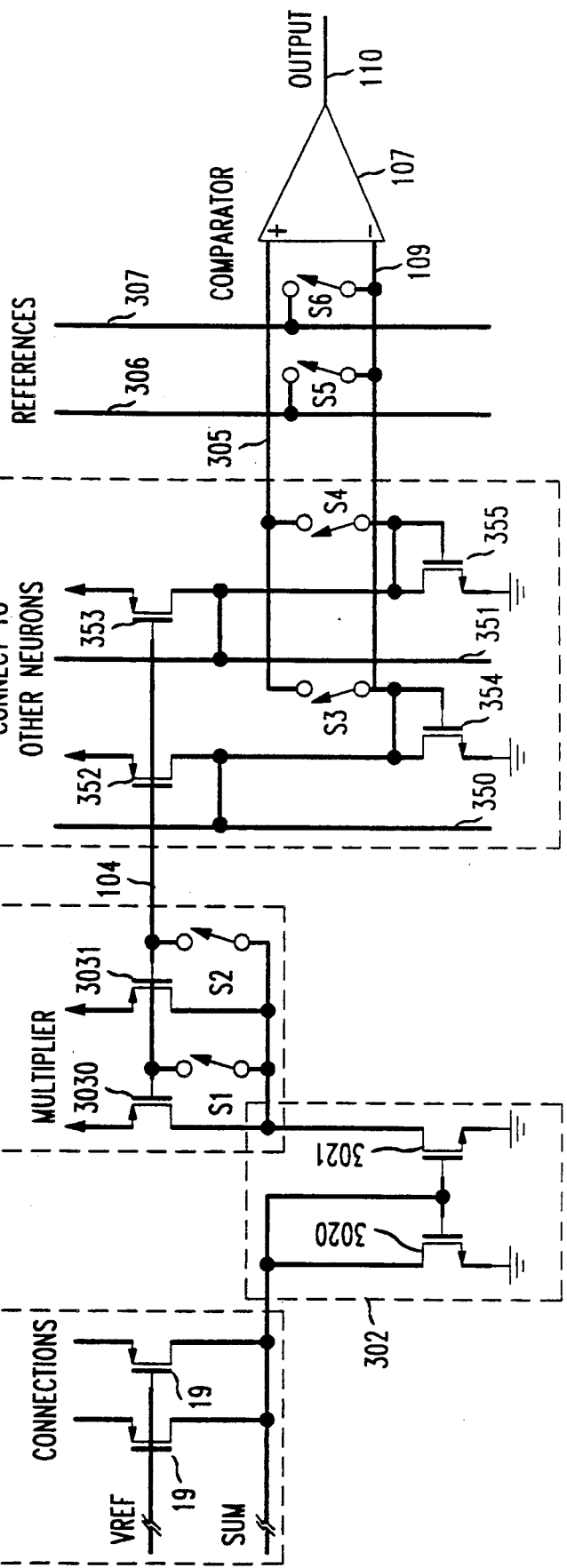
FIG. 3 shows a more detailed schematic drawing of the neuron shown in FIG. 1.

FIG. 3 shows a more detailed schematic drawing of the neuron shown in FIG. 1. The connections utilized in the circuit shown in FIG. 3 have been simplified and truncated to indicate the final transistor and its connection to line SUM for the final two connections in the neuron. Each connection has been realized using the circuit shown in FIG. 2. Therefore, the final transistor of the connection as shown in FIG. 3 corresponds to transistor 19 in FIG. 2.

Connection circuit 301 provides its output on line SUM to current mirror 302. Current mirror 302 provides isolation between connection circuit 301 and multiplier circuit 303. It will be clear to those skilled in the art that the output of connection circuit 301 can be supplied directly to the input of multiplier 303 without the need for isolation provided by current mirror 302. Any standard current mirror is suitable for use as current mirror 302. In the particular current mirror shown in FIG. 3, line SUM is connected to the drain of PMOS transistor 3020 and to the gates of PMOS transistors 3020 and 3021. The output of current mirror 302 is provided from the drain of transistor 3021. Sources of transistors 3020 and 3021 are attached to ground.

Programmable scalar multiplier 303 includes a pair of NMOS transistors 3030 and 3031 whose drains are connected together to serve as input to multiplier 303. The sources of the transistors are connected to a supply potential. The gates of transistors 3030 and 3031 are connected together and serve as the output lead 104.

Figure 4:
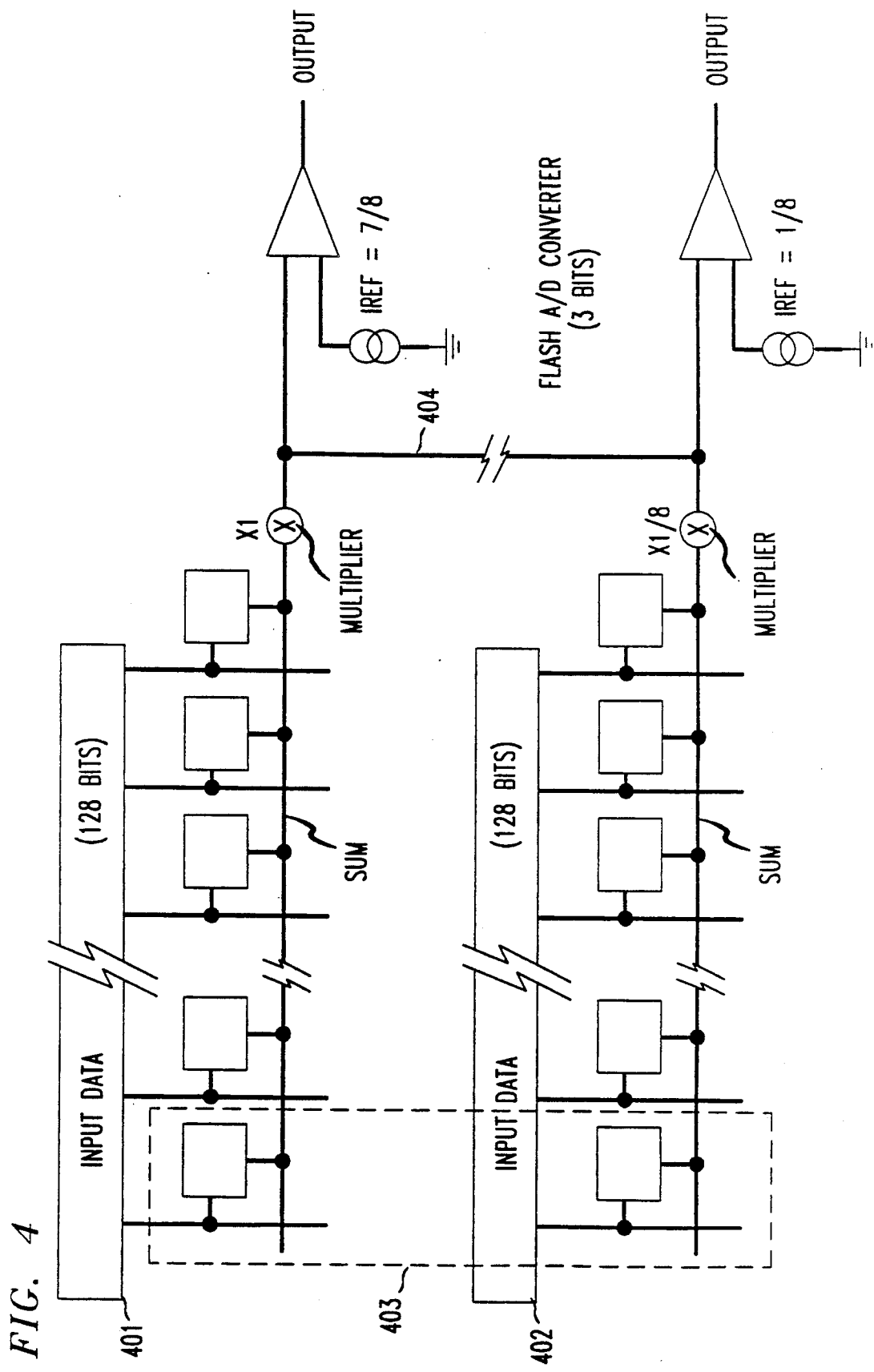
FIG. 4 shows a simplified interconnection of four neurons to form a more complex neuron having an analog depth of four bits.

Control switch S1 is connected between the gate and drain of transistor 3030 while control switch S2 is connected between the drain and gate of transistor 3031. The position of switches S1 and S2 controls the value of the scalar used in multiplying the value received from connection circuit 301 on line SUM. In other words, the width of the transistors 3030 and 3031 in multiplier 303 is programmed by switches S1 and S2. In this example, the position of switches S1 and S2 can be opened or closed to set multiplier values in the neuron to any of four different values, namely, 1, $\frac{1}{2}$, $\frac{1}{4}$, and $\frac{1}{8}$. The scalar values other than 1 are used when several neurons are concatenated together as shown, for example, in FIG. 4 to obtain a degree of analog depth such as a connection with analog depth of four bits (FIG. 4). It should be noted that multiplier 303 corresponds to multiplier 103 described above and shown in FIG. 1.

Lead 104 from multiplier 303 is supplied to programmable build out network 304. As shown in FIG. 3, build out network 304 includes bus line 350 and 351, input transistors 352 and 353, switches S3 and S4, and PMOS transistors 354 and 355. Input transistors 352 and 353 are NMOS transistors shown having their gates connected to lead 104. Sources of these transistors are connected to a supply potential. The drain of transistor 352 is connected to the drain of transistor 354 and to bus line 350. In a similar manner, the drain of transistor 353 is connected to the drain of transistor 355 and to bus line 351. Transistors 354 and 355 have their sources connected to ground. The gate of transistor 354 is coupled to control switch S3 and to the drain of transistor 354. The gate of transistor 355 is coupled to control switch S4 and to the drain of transistor 355. The outputs of switches S3 and S4 are connected together on line 305. In order to build the connection out to other neurons, one of four choices representing the degree of concatenation by setting the control switches S3 and S4 to various combinations of opened and closed positions. Bus lines 350 and 351 are interconnected among the neurons which are being concatenated. The input values on line 104 supplied to build out network 304 in all concatenated neurons are summed together in the build out networks and appear on line 305.

The nonlinearity in the neuron is synthesized by using reference potential levels supplied to lines 306 and 307 in conjunction with switches S5 and S6. Switch S5 connects the reference potential level on line 306 to line 109. Similarly, switch S6 connects the reference potential level on line 307 to line 109. The closure of control switches S5 and S6 causes the reference potential levels of lines 306 and 307 to be summed together and input to comparator 107. Line 305 from the programmable build out circuit is also supplied to an input of comparator 107. As described above, a threshold comparison is performed in comparator 107 between the signals on lines 305 and 109. The comparator output appears on line 110. This output is the neuron output.

FIG. 4 shows a neuron comprising the interconnection of four connection circuits to provide an analog depth of four bits to the computation performed in the neuron. The most significant bit of the input data is shown as reference numeral 401 whereas the least significant bit of the four bits of input data is shown as reference numeral 402. The four bits comprising one word of input data from the most significant bit through the least significant bit are shown within dashed box 403. Scalar factors used in the scalar multipliers are shown above each multiplier. The interconnection of the neurons is depicted diagrammatically as line 404 which is functionally equivalent and a simplified representation of the programmable build out network 304. In the neuron shown in FIG. 4, a flash A/D conversion of three bits is shown to be performed by the comparators in which different fixed reference potential levels are supplied to each comparator. It should be noted that the reference potential levels shown in FIG. 4 are for purposes of explication and not limitation.

Figure 5:
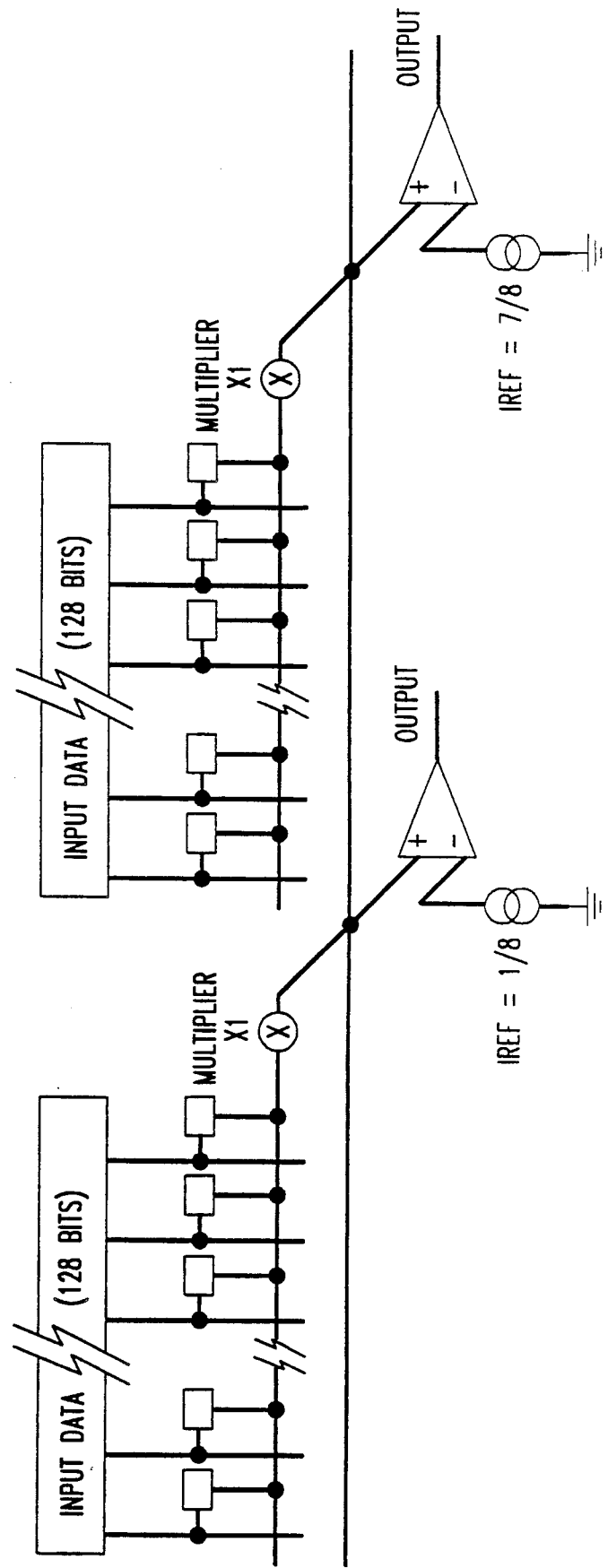
FIG. 5 shows a simplified interconnection of neurons to form a more complex neuron having a depth of one bit and the capability of accepting up to 1024 input data bits.

While it is possible to increase the analog depth of the neuron to a fixed number of bits, it is also possible to utilize the scalar multipliers in conjunction with the programmable build out circuit to form a neuron capable of accepting a long string of input data. For example, the neuron realized in experimental practice utilizes a connection circuit which accepts 128 bits of input data. It is possible by judicious use of the build out circuits to accept up to 1024 bits of input data where each bit of data represents an entire input word, that is, an input word having an analog depth of one bit. One such exemplary complex neuron is shown in FIG. 5.

Reconfigurability of this neuron is afforded by the control switches, primarily, switches S1, S2, S3, and S4. An external control unit such as a microprocessor (not shown in the FIGs.) may be connected to the switches to effect opening and closure of the switches and, thereby, to reconfigure the overall neural network comprising the individual neurons. From experimental practice, it has been found that reconfiguration times are on the order of 1 μs or less.

I claim:

1. A computational device for use in an artificial neural network and responsive to a plurality of input data words for computing a result data word, the computational device comprising:

connection means responsive to the plurality of input data words for storing a corresponding plurality of weight data words and for multiplying the input data words by corresponding ones of the weight data words to form an output word, the output word being the sum of each multiplication, the connection means having a plurality of output stages connected to a single output sum line for supplying the output word;

means connected to the single output sum line for multiplying the output word by a predetermined scaling value less than or equal to 1, said multiplying means including means for controllably changing the predetermined scaling value from one value to another;

means connected to an output of said multiplying means for building out the computational device to include connection to at least one other computational device on an output bus line and for summing the output of the multiplying means to the output bus line; and means connected to the output bus line and to a supplied reference potential for comparing signals on the output bus line to the reference potential to generate the result data word; the comparing means including means for selectively connecting first and second reference potentials in an additive manner to form said supplied reference potential.

* * * * *